United States Patent [19]

Ellis et al.

[11] Patent Number: 5,699,255

[45] Date of Patent: Dec. 16, 1997

[54] MAP TRANSMISSION FOR IN-VEHICLE NAVIGATION SYSTEM WITH DYNAMIC SCALE/DETAIL ADJUSTMENT

[75] Inventors: Thomas W. Ellis, San Jose; Kiyoko M. Mura-Smith, Los Altos Hills; Charles N. Branch, Sunnyvale; John F. Schipper, Palo Alto, all of Calif.

[73] Assignee: Trimble Navigation Limited, Sunnyvale, Calif.

[21] Appl. No.: 544,554

[22] Filed: Oct. 18, 1995

[51] Int. Cl.[6] .................................................. G06F 165/00
[52] U.S. Cl. ........................ 364/449.6; 340/995; 342/450
[58] Field of Search .............................. 364/443, 449.1, 364/449.2, 449.5, 449.6, 460; 340/990, 995; 342/357, 450; 379/58, 59, 60

[56] References Cited

U.S. PATENT DOCUMENTS

| | | | |
|---|---|---|---|
| 4,698,781 | 10/1987 | Cockerell, Jr. | 364/449.1 X |
| 4,893,247 | 1/1990 | Waudoit | 364/449.2 |
| 4,951,212 | 8/1990 | Kurihara et al. | 364/449.2 |
| 4,972,319 | 11/1990 | Delorme | 340/990 |
| 5,084,822 | 1/1992 | Hayami | 364/449.6 |
| 5,155,689 | 10/1992 | Wortham | 364/460 |
| 5,307,278 | 4/1994 | Hermans et al. | 364/449.2 X |
| 5,406,493 | 4/1995 | Goto et al. | 364/449.2 |
| 5,528,248 | 6/1996 | Steiner | 342/357 |
| 5,544,061 | 8/1996 | Morimoto et al. | 340/995 X |

*Primary Examiner*—Collin W. Park
*Attorney, Agent, or Firm*—Wagner,Murabito & Hao

[57] ABSTRACT

An apparatus and method for providing map information of varying resolution to a navigation device. In one embodiment, a position determining system is attached to a navigation device. The position determining system generates position information, such as location, of the navigation device. The position information is transmitted to a base station containing map information. Map information related to, for example, the location of the navigation device is then transmitted from the base station to the navigation device. The map information is displayed on a display of the navigation device. Therefore, the base station only transmits map information related to the position information of the navigation device.

19 Claims, 9 Drawing Sheets

MAP TRANSMISSION FOR IN-VEHICLE NAVIGATION SYSTEM WITH DYNAMIC SCALE/DETAIL ADJUSTMENT

TECHNICAL FIELD

This invention relates to navigation systems. Specifically, the present invention relates to transmitting map information of varying resolution and detail to a navigation device.

BACKGROUND ART

Navigation systems, such as in-vehicle navigation systems, are well known in the art. Typically, an in-vehicle navigation system consists of a console having a display screen as a part of the console or physically separated from the console. A CD-ROM disc containing, for example, maps and travel information is inserted into the console. The console then displays the maps or travel information on the display screen. Travel information may include such items as points of interest, local restaurants, theater locations, and the like. Commonly, numerous discs, or even numerous sets of discs, are required to provide adequate detailed geographic coverage of a typical metropolitan area. Thus, should a user desire to travel beyond the "range" of a disc or set of discs, the user must obtain additional sets of discs for each area of interest. That is, conventional in-vehicle navigation systems require that an extensive collection of CD-ROM discs be carried within the vehicle for long distance traveling. Additionally, prior art CD-ROM based systems require periodic updating. That is, even after the user has purchased a set of CD-ROM discs, new replacement discs must be acquired, for example, as roads and points of interest change.

As an additional drawback, conventional CD-ROM discs contain vast amounts of information which may not be relevant or of interest to each consumer. Specifically, a commuter seeking the shortest route to a location in a specific area is usually not concerned with local points of interest. However, a vacationer passing through the same area as the commuter might be primarily interested in local points of interest. Although the needs of the commuter and the vacationer differ, each of the consumers is forced to carry the same CD-ROM discs. That is, even though the commuter desires "little" travel information, the commuter must still utilize the overly detailed CD-ROM disc. Thus, conventional in-vehicle navigation systems are unable to tailor the amount of information which is required to be purchased and carried by consumers. Therefore, users of conventional in-vehicle navigation systems may be required to spend money on a CD-ROM disc containing more information than is desired or needed.

Recently, Global Positioning System (GPS) technology has been integrated with in-vehicle navigation systems in an attempt to provide greater service to the consumer. In such a combined system, satellites provide positioning signals for the vehicle. The vehicle's precise location is then displayed over the map information derived from the CD-ROM disc currently in the console. Therefore, the user of the combined system is able to identify the user's current position in relation to, for example, the user's destination. However, such GPS technology is useful, in conjunction with the in-vehicle navigation system, only if the user has a CD-ROM disc covering the area at which the vehicle is located.

Thus, a need exists for a navigation system which does not require carrying an extensive collection of CD-ROM discs within the vehicle, a system which is able to tailor the information provided a user, and a system which is useful in conjunction with a GPS over a large area.

DISCLOSURE OF THE INVENTION

It is therefore an object of the present invention to provide a navigation system which does not require carrying an extensive collection of CD-ROM discs within the vehicle, a system which is able to tailor the information provided a user, and a system which is useful in conjunction with a GPS over a large area. The above object has been achieved by a navigation system which utilizes position information to provide map information of varying resolution and detail to a navigation device. In one embodiment of the present invention, a position determining system is attached to a navigation device such as, for example, an in-vehicle navigation system. The position determining system generates position information, such as the location or velocity, of the in-vehicle navigation system. The position information is then transmitted to a base station containing map information. The base station then transmits relevant map information back to the in-vehicle navigation system. By transmitting the information from a base station to the in-vehicle navigation system, the present invention eliminates the need for the user to transport an extensive collection of CD-ROM discs.

In the present embodiment, the map information transmitted to the in-vehicle navigation system is directly related to the position information of the in-vehicle navigation system. That is, only map information relating to the position of the in-vehicle navigation system is transmitted from the base station. Therefore, a user does not have to determine which of a number of CD-ROM discs is appropriate for use at a given time or location. Additionally, the present embodiment of the invention provides map information of varying resolution and detail. For purposes of the present invention, varying resolution means varying scale and/or detail. For example, a vacationer can elect to have detailed map information displaying multiple points of interest, theater sites, intricate street details, and the like transmitted to the vacationer's in-vehicle navigation system. On the other hand, a traveling salesperson seeking the most expedient route to a client's place of business can elect to have only rudimentary street directions transmitted from the base station to the salesperson's in-vehicle navigation system. Thus, in the present embodiment, the system "tailors" the map information transmitted to a consumer. Specifically, by using map information of varying resolution the present invention provides only relevant information, provides map information only when needed, and provides the map information only at a desired level of detail.

In the present invention, the usefulness of GPS technology is not limited by the consumer's CD-ROM disc library. Because the present embodiment does not require CD-ROM discs, the GPS technology can be used in conjunction with the in-vehicle navigation system whenever the vehicle is within transmitting range of a base station. As stated above, in conventional systems GPS technology is only useful, in conjunction with the in-vehicle navigation system, if the user has a CD-ROM disc covering the area in which the vehicle is located. The present invention thus allows utilization of GPS technology in conjunction with an in-vehicle navigation system over a much larger area than is possible using conventional systems.

These and other objects and advantages of the present invention will no doubt become obvious to those of ordinary skilled in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
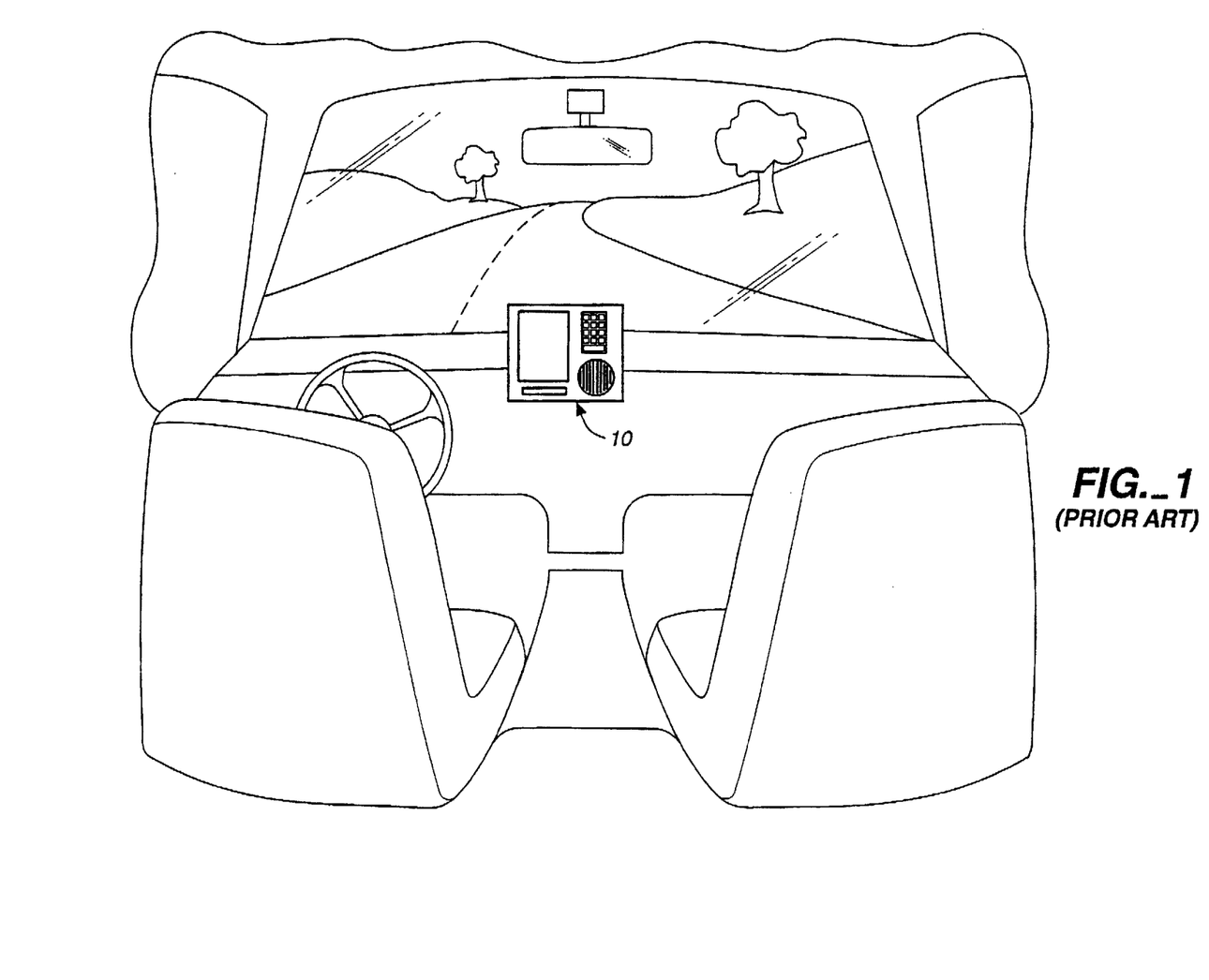
FIG. 1 is a perspective view of the interior of a vehicle containing a Prior Art in-vehicle navigation system.

With reference now to Prior Art FIG. 1, the interior of a vehicle containing a prior art in-vehicle navigation system 10 is shown. As shown in Prior Art FIG. 1, in-vehicle navigation system 10 is typically located on the dashboard of a vehicle within view of the driver of the vehicle.

Figure 2:
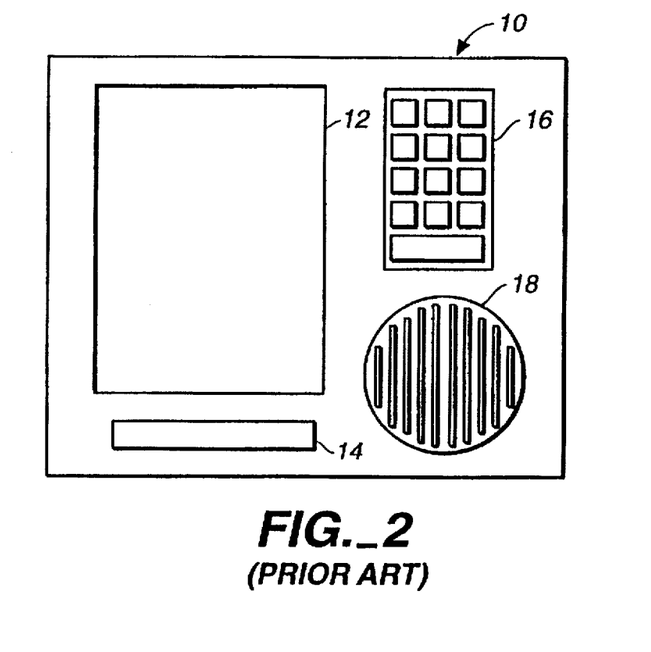
FIG. 2 is a detailed view of the in-vehicle navigation system of FIG. 1.

With reference next to Prior Art FIG. 2, prior art in-vehicle navigation system 10 is shown in detail. As shown in Prior Art FIG. 2, prior art in-vehicle navigation system 10 typically includes a display screen 12, a CD-ROM port 14, a user keypad 16, and a speaker 18.

To operate prior art in-vehicle navigation system 10, the user must first know the present location of the vehicle in which the prior art in-vehicle navigation system 10 is disposed. The user of the vehicle must then insert into CD-ROM port 14 a CD-ROM disc or set of discs which corresponds to the present location of the vehicle. For example, if the user of prior art in-vehicle navigation system 10 is in the San Francisco Bay area, a CD-ROM disc or set of discs containing information about the San Francisco Bay area must be inserted into CD-ROM port 14. The user then typically enters the vehicle's present location and the vehicle's destination into prior art in-vehicle navigation system 10 using keypad 16. Should the user travel to, for example, the Greater Los Angeles metropolitan area (or any other area not covered by the San Francisco Bay area CD-ROM disc or set of discs), a separate CD-ROM disc or set of discs covering the Greater Los Angeles metropolitan area must be inserted into CD-ROM port 14. Thus, when the user's selected origination and destination locations are not covered by the same CD-ROM disc, or set of discs, the user must replace the CD-ROM discs or discs in CD-ROM disc port 14 with the appropriate CD-ROM disc or set of discs. Hence, many prior art in-vehicle navigation systems require that the user periodically change the CD-ROM disc in port 14. Some prior art in-vehicle navigation systems will indicate the proper direction for the vehicle to travel in order to reach the selected destination. Additionally, some prior art in-vehicle navigation systems also provide audio information to the user via speaker 18.

Figure 3:
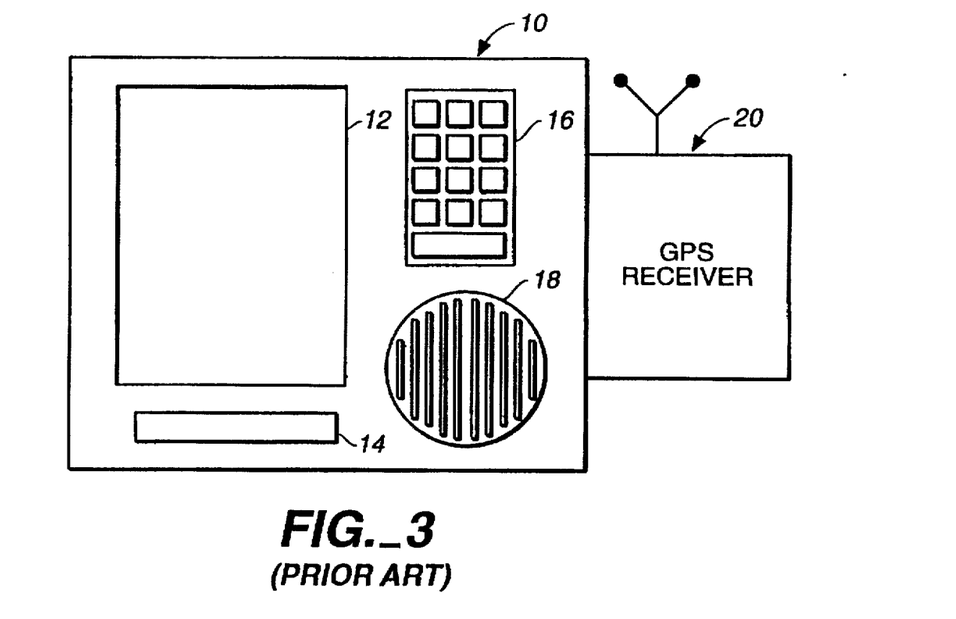
FIG. 3 is a perspective view of the interior of a vehicle containing a Prior Art in-vehicle navigation system coupled to a GPS receiver.

With reference next to Prior Art FIG. 3, a perspective view of a prior art in-vehicle navigation system 10 coupled to a GPS receiver 20 is shown. In the prior art in-vehicle system of FIG. 3, the location of the vehicle is determined by GPS receiver 20. The position of the vehicle is then displayed on screen 12 over the display generated by the CD-ROM inserted into port 14. However, GPS-based representation of the user's vehicle is useful only if the appropriate CD-ROM disc being used. That is, if the user is located in the San Francisco Bay area, the user must have the CD-ROM disc corresponding to the San Francisco Bay area inserted in port 14 in order for the position of the vehicle to be properly displayed over the map of the San Francisco Bay area. If the user does not have the appropriate CD-ROM disc in port 14, the GPS determined position of the vehicle is not readily displayable.

Figure 4:
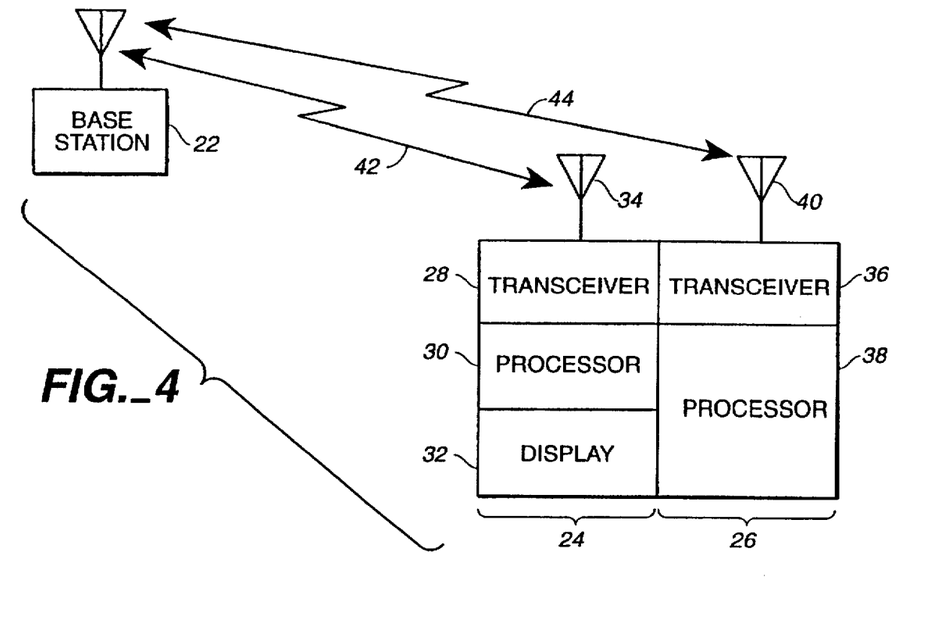
FIG. 4 is a schematic view of an in-vehicle navigation system in accordance with the present claimed invention.

With reference next to FIG. 4, a schematic view of the present invention is shown. As shown in FIG. 4, the present invention includes a base station 22, a navigation device 24, and a position determining system 26. Navigation device 24 of the present invention is well suited to being located within a vehicle. In the present embodiment, navigation device 24 has a transceiver 28, a processor 30, a display 32, and an antenna 34 integral therewith. Likewise, in the present embodiment, position determining system 26 includes a transceiver 36, a processor 38, and an antenna 40. As shown in FIG. 4, in the present embodiment, base station 22 is communicatively coupled to navigation device 24 via communication link 42, and base station 22 is communicatively coupled to position determining system 26 via communication link 44.

In the present invention, communication link 42 and/or 44 is established in one of many ways. For example, communication links 42 and 44 can be established using a Metricomm Wide Area Network (WAN) link operating at approximately 900 MHz. Communication link 42 and/or 44 can also be established using a standard cellular telephone connection. Communication link 42 and/or 44 can also be established using a trunked radio system. In such a system, base station 22, navigation device 24, or position determining system 26 first contacts "headquarters" or a communication base and is assigned a communication channel. Communication must take place over the assigned channel. Communication link 42 and/or 44 can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, and the user is assigned a channel. Bursts of packet data are then sent over the communication link, using, for example, TCP/IP protocol, until the data are completely transmitted or until the channel is no longer free. If the data is not completely transferred when the channel expires, communication link 42 and/or 44 is then re-established using a different channel. As yet another example, communication link 42 and/or 44 can be established using a Subscription Mobile Radio (SMR) system wherein base station 22, navigation device 24, and position determining system 26 have an assigned frequency for communication link 42 and/or 44. The present invention is also well suited to having an rf communication link 42 and/or 44 between base station 22, navigation device 24, and position determining system 26.

Although FIG. 4 shows only a single base station 22, the present invention is suited to having separate base stations located at a plurality of geographic locations. By having numerous base stations, navigation device 24, remains in communication with at least one base station even when moved through plurality of geographic locations. Additionally, navigation device 24 is also well suited to displaying multiple views on display 32 simultaneously. As an additional feature, the present invention is also well suited to receiving compressed position-related map information of varying resolution from base station 22. The compression of the map information can be achieved using any suitable data compression method such as, for example, Adobe Portable Document Format (PDF). When the map information transmitted to navigation device 24 is compressed, processor 30 is used to decompress the map information using programs such as, for example Adobe Acrobat. A detailed description related to topics such as the aforementioned transmission of compressed map information is found in U.S. patent application Ser. No. 08/440,246 to Woo, filed Feb. 12, 1995 entitled "A Satellite Navigation Receiver with Map Graphics and Hypertext Driven by PDF Database" which is incorporated herein by reference as background material.

Base station 22 of the present invention contains well known logic for accessing stored map databases based upon selection criteria. That is, base station 22 contains stored map information of varying scale and/or detail. The map information transmitted to the user is selected from the available stored map information.

As navigation device 24 moves along, position determining system 26 continuously generates the position information of navigation device 24. Position determining system 26 receives radio navigation signals via antenna 40 and transceiver 36, and processes the radio navigation signals to generate position information of navigation device 24. Typically, position determining system 26 generates position information indicating the latitude, longitude, and altitude of navigation device 24. Position determining system 26 also generates velocity information for navigation device 24 by measuring the Doppler shift of signals between antenna 34 and at least one radio navigation signal transmitter such as, for example, a GPS satellite, not shown. The Doppler shift velocity measurements are obtained using well known and well understood techniques indigenous to the GPS receiver art. Thus, position information such as the speed, direction, and heading of navigation device 24 are obtained by position determining system 26. Additionally, position determining system 26 very accurately determines the time at which navigation device 24 is at any specific location.

Furthermore, in the present embodiment, position determining system 26 transmits position information of navigation device 24 to base station 22 via link 44. Although transmission of the position information occurs over link 44 in the present embodiment, the present invention is also well suited to having the position information of navigation device 24 transmitted to base station 22 via transceiver 28 using communication link 42. By transmitting the position information via transceiver 36, the need for a transmission link directly from positioning determining system 26 is eliminated. Conversely, the present invention is also well suited to having the base station 22 and navigation device 24 communicate via transceiver 36 of position determining system 26. By transmitting the map information of varying resolution directly to transceiver 36, the need for transmission of data directly from or to navigation device 24 is eliminated.

With reference still to FIG. 4, in the present embodiment, base station 22 transmits map information of varying resolution to navigation device 24. Once again, for purposes of the present invention, map information of varying resolution and detail refers to map information of varying scale and/or detail. In the present embodiment, navigation device 24 receives the map information transmitted from base station 22 and displays the map information on display 32. In the present invention, the resolution of the map information transmitted from base station 22 is varied to accommodate the needs and/or requests of a user of navigation device 24. That is, only relevant and/or desired map information related to the current position information of navigation device 24 is transmitted to navigation device 24. For example, if position determining system 26 determines that navigation device 24 is in a region of the San Francisco Bay area, the transmitted map information of varying resolution is related to the aforementioned region of the San Francisco Bay area. Thus, the present invention provides for transmission of map information of varying resolution and detail to the user, wherein the map information is directly related to position information of navigation device 24. By transmitting map information of varying resolution and detail related to the position information of navigation device 24, the present invention eliminates the need for the user to attempt to determine the user's current position. Thus, the present invention also eliminates the need for a user to decide which CD-ROM or set of CD-ROMs is appropriate for use at any given time and location. Additionally, the present invention eliminates the need for a user to purchase updated CD-ROM discs as, for example, roads or points of interest change.

As an additional benefit, the present invention is also well suited to transmitting user selected information. For example, base station 22 of the present invention contains universal maps which can be simplified and transmitted to the user. That is, the present invention provides for the intelligent selection of the specific map information transmitted to a user. Hence, when a user selects to receive only map information necessary to guide the user to a destination, a simplified map omitting superfluous details is transmitted to the user. In such an instance, the user of the present invention informs base station 22 of the desired destination, base station 22 then sends only map information relevant for use in directing the user to the selected destination.

The present invention is also well suited to using, for example, a live operator to assist with the selection of the map material to be transmitted. In such an embodiment, when a user telephones base station 22, a live operator assists the user in selecting which map information is transmitted to the user. The operator can provide information based on the user's current position. For example, the operator can inform the user of closely located restaurants, gas stations, and the like. The present invention is also well suited to having the selection of map information handled through a computerized system incorporating, for example, touch tone controlled menus.

In the present invention, position determining system 26 is, for example, a satellite-based radio navigation system. Satellite-based radio navigation systems such as, for example, the Global Positioning System (GPS), or the Global Orbiting Navigational System (GLONASS) are well suited for use with the present invention. Although such systems are specifically mentioned in the present embodiment, the present invention is also well suited to land-based radio navigation systems such as, for example, LORAN, Shoran, Decca, and TACAN.

Figure 5:
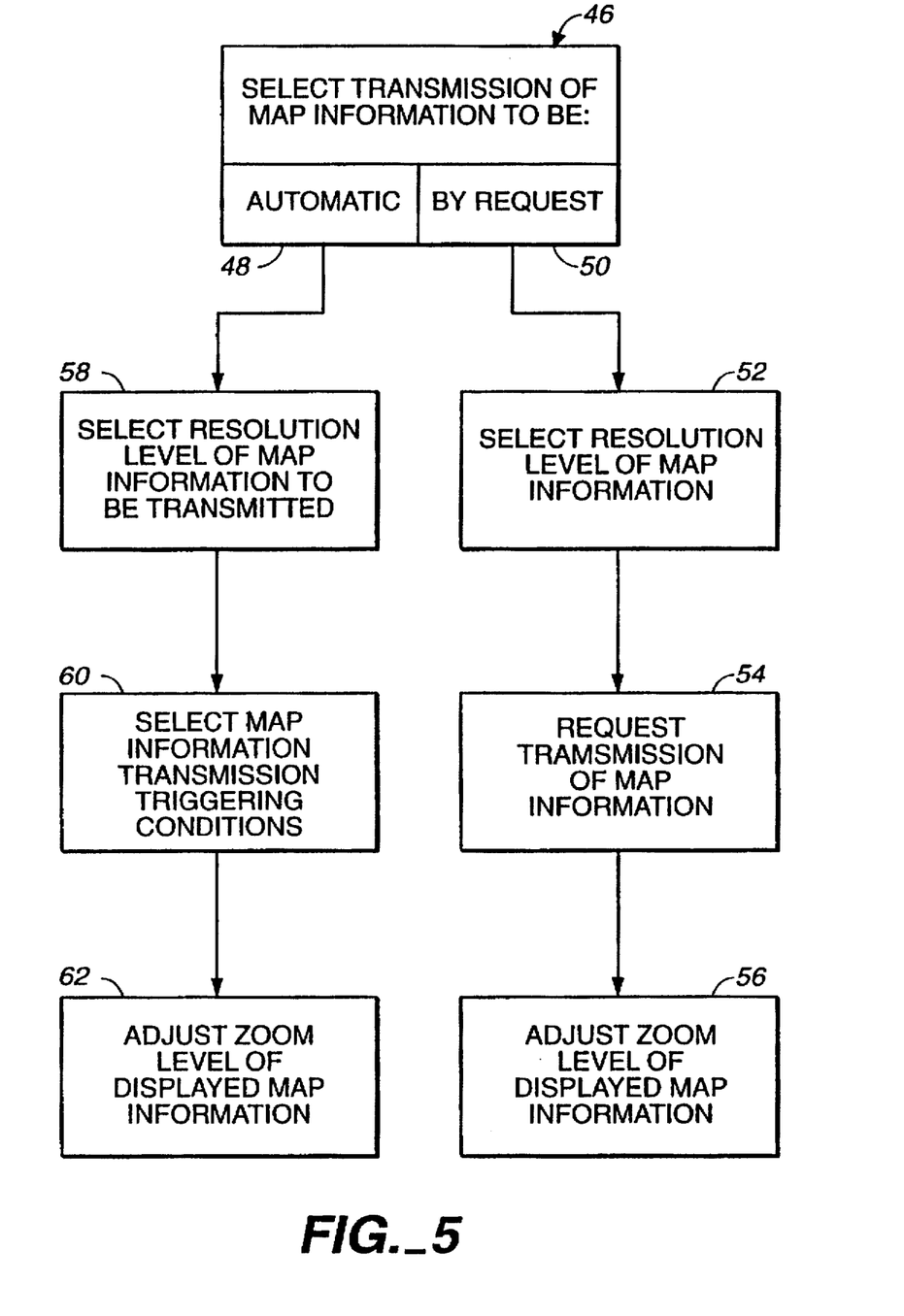
FIG. 5 is a flow chart illustrating steps employed when using the in-vehicle navigation system of the present claimed invention.

Referring now to FIG. 5, a flow chart illustrating steps used to transmit map information of varying resolution and detail in accordance with the present claimed invention is shown. In the present embodiment, as shown in step 46, the user of the present invention selects whether transmission of map information of varying resolution and detail is to be transmitted automatically, as shown in sub-step 48, or whether the transmission of map information of varying resolution and detail is to be transmitted only upon request by the user, as shown in sub-step 50. In the present embodiment, user selection is accomplished via a pull-down menu selection method. Although such a selection method is used in the present embodiment, the present invention is also well suited to numerous other types of selection methods including, but not limited to, keypad selection, voice command recognition, touch screen selection, and the like. As described above, the present invention provides for the transmission of map information of varying resolution and detail, wherein the map information is related to the position information of the navigation device. However, the present invention further allows the user to tailor the map information to a desired resolution level or detail level. That is, in addition to transmitting position-related map information of varying resolution and detail, the present invention allows the user to select the scale and detail of the transmitted map information.

With reference still to FIG. 5, if the user decides to have the map information of varying resolution and detail transmitted only upon request, sub-step 50, the user must next, in step 52, select the resolution level and or detail level of the map information to be transmitted. In the present embodiment, the user is able to select the desired resolution level and/or detail level of the map information from a menu displayed on the screen of the present navigation device.

Figure 6A:
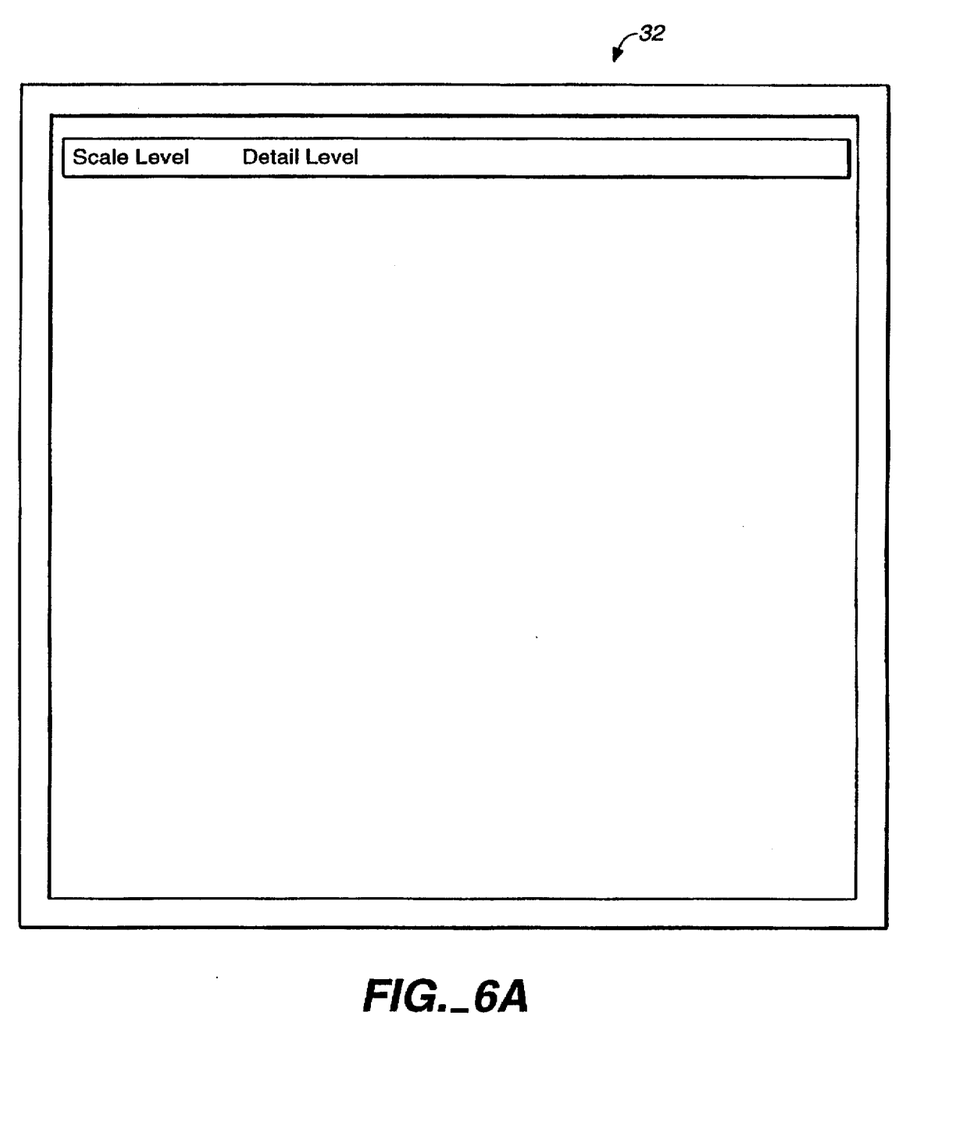
FIGS. 6A–6C are typical resolution level selection screen displays in accordance with the present claimed invention.
Figure 6B:
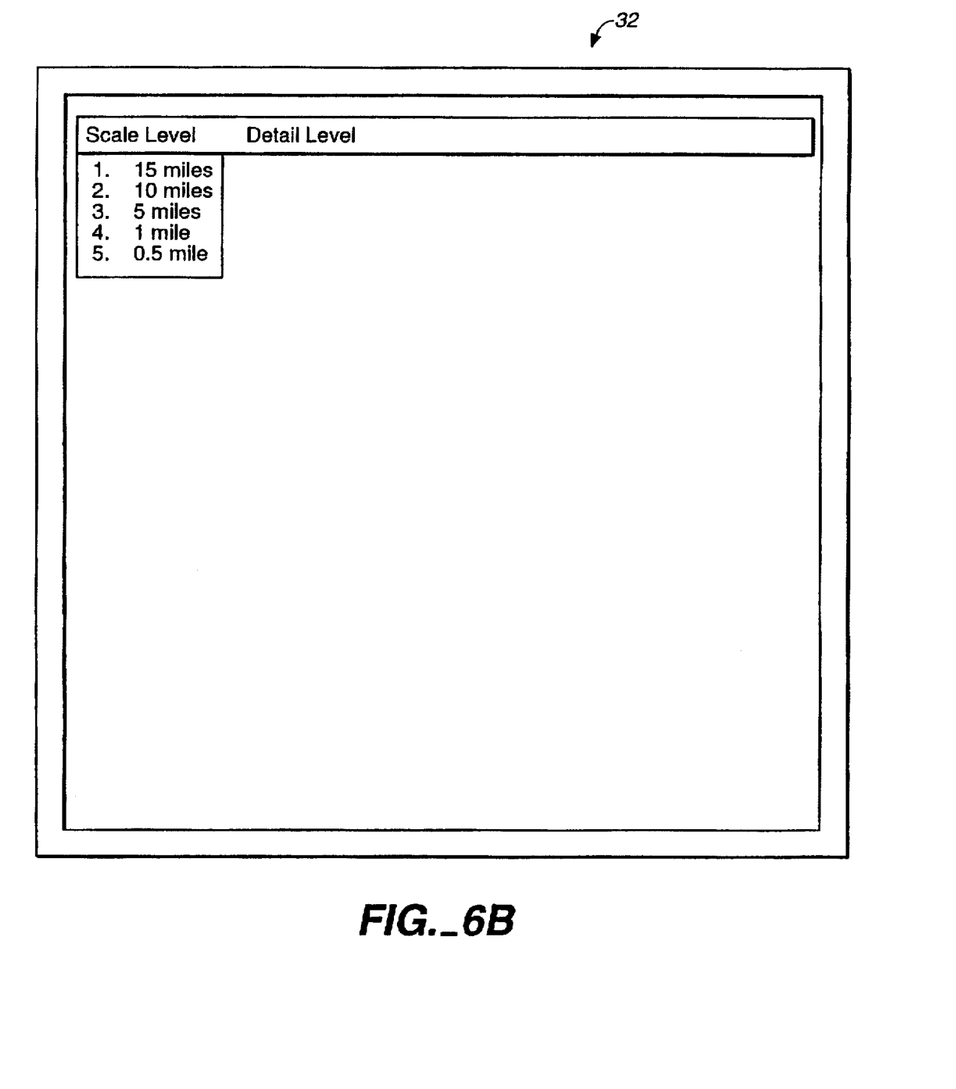
Figure 6C:
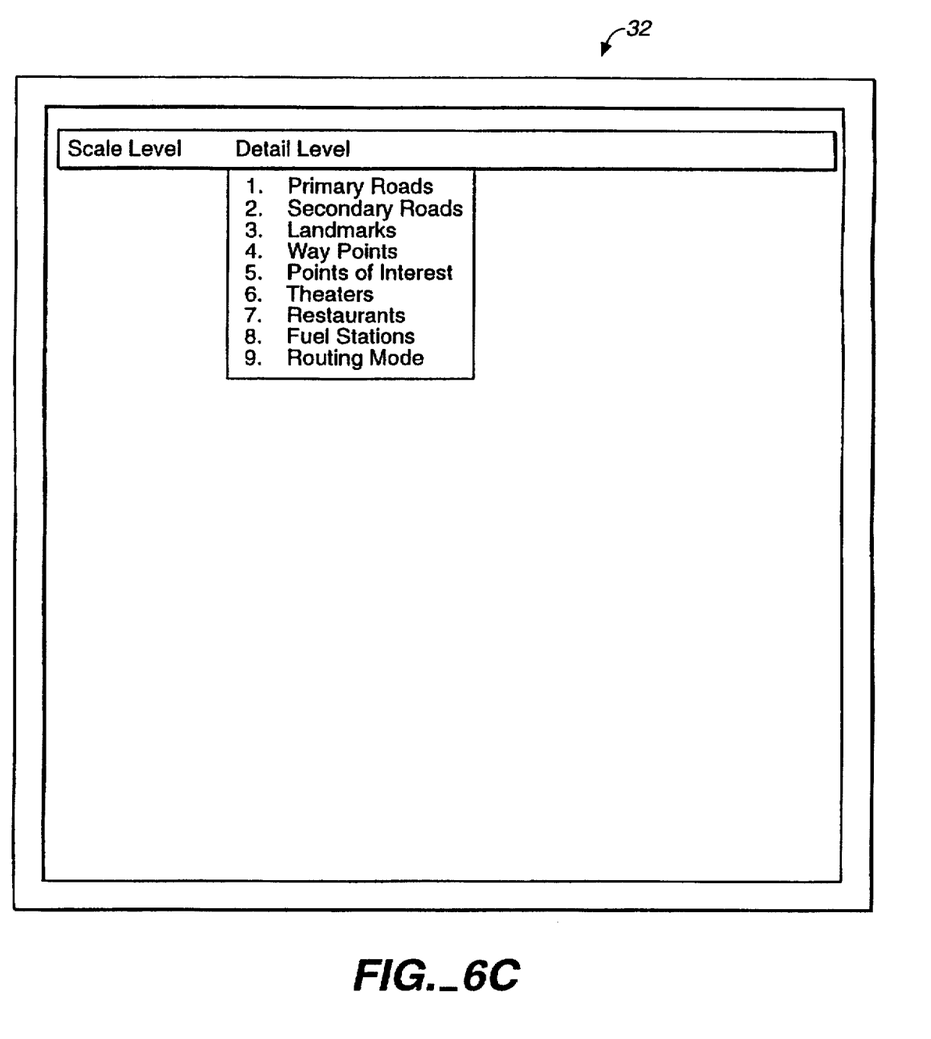

With reference next to FIGS. 6A–6C, typical resolution level and detail level selection screen displays are shown in accordance with the present claimed invention. As shown in FIG. 6A, using a pull-down window display, the user selects a Scale Level.

With reference next to FIG. 6B, in the present embodiment, as the user pulls down on the Scale Level tab, numerous screen height options are presented. Commonly, scale levels are quantified in terms of "screen height." Screen height is defined as the distance covered by the displayed map from the bottom of display screen 32 to the top of display screen 32. Thus, a screen height of 0.5 mile, shows a much smaller area than a screen height of 15 miles. Although specific screen heights are shown in FIG. 6B, the present invention is also well suited to numerous other screen heights.

Referring now to FIG. 6C, in the present embodiment, the user also determines the desired level of detail in the transmitted map information. Specifically, as the user pulls down on the Detail Level tab, numerous detail options are presented. In the present embodiment, the user can select one or a plurality of detail options. For example, a user can select to have map information covering Primary Roads, Landmarks, and Fuel Stations transmitted to, and displayed by, the present navigation device. As shown in FIG. 6C, the present invention also includes a Routing Mode. When using the Routing Mode, the user enters a destination address, and the destination address is typically converted to a latitude/longitude coordinate, using geo-coding found in most GIS databases. The location of the destination and the route leading to the destination are then displayed on the display screen, provided that the destination is within the area currently displayed on the screen. In the present embodiment, a selected route to the destination is boldly displayed to differentiate the route from the other displayed roadways. Although the route to the destination is boldly displayed in the present embodiment, the present invention is also well suited to other display techniques which highlight the route to the destination. If the destination is outside of the area displayed on the screen, only those portions of the route leading to the destination which are currently displayed on the screen are highlighted.

Referring again to FIG. 5, after selecting the resolution level and/or detail level of the map information to be transmitted, the user then views the information displayed on the display screen of the navigation device, and adjusts the Zoom Level to a desired level. For example, a user can elect to selectably zoom in on a chosen area displayed on the screen. In the present embodiment, Zoom Level is adjusted using, for example, a keypad. Although a keypad is specified in the present embodiment, the present invention is also well suited to the use of other control mechanisms such as voice command recognition, touch screen selection, and the like.

In the present invention, the position of the navigation device is initially visually represented in the center of the screen. By visually representing the position of the navigation device in the center of the screen, the user is able to readily determine the position of the navigation device with respect to the displayed map information. Furthermore, in the present embodiment, the position of the visual representation of the navigation device is moved with respect to the displayed map information, as the position of the navigation device changes. Thus, the user of the present invention is able to "track" the change in position of the navigation device with respect to the displayed information. When the position of the visual representation of the navigation device nears the edge of the display screen, the user simply requests the transmission of new map information. The newly transmitted map information is then displayed on the screen with the position of the navigation device once again visually represented in the center of the screen. The user then re-selects the Scale Level, Detail Level, and Zoom Level as described above, if desired.

In the present embodiment, map information is only transmitted to the user of the present invention when the user desires to have map information transmitted thereto. Hence, the user of the present invention only pays for desired map information. That is, unlike prior art in-vehicle navigation devices, which require each user to purchase expensive CD-ROMs often containing information irrelevant to certain users, the present invention only requires each user to pay for map information which is actually requested. Additionally, the present invention allows the user to tailor the received map information to contain only map information which the user wants. For example, a traveling salesperson may desire to have only a rudimentary road map displayed by the navigation device. On the other hand, a tourist may desire to have Landmarks, Points of Interest, Theaters, Restaurants, and Fuel Stations displayed by the navigation device. The present invention allows each consumer to create a position-related display of map information satisfying that consumer's particular needs. The present invention also allows the consumer to receive and pay only for what is needed or desired. Thus, the salesperson seeking only a rudimentary road map can be charged less than the tourist who requests substantial details.

In the present embodiment, position information generated by position determining system 26 of FIG. 4 is transmitted to base station 22 only when the user requests map information. The present invention is also well suited to transmitting position information to base station 22 at any given interval. The present invention is well suited to various mapping display methods. For example, the present invention is well suited to the relatively fast technique of raster mapping, and the present invention is also well suited to vector mapping of the transmitted position-related map information.

With reference again to FIG. 5, if the user decides to have the map information of varying resolution transmitted automatically, sub-step 48, in step 58 the user selects the desired level of scale and detail of the displayed map information. The scale and detail levels are selected in the same manner as described above in conjunction with FIGS. 6A–6C.

Next, as shown in step 60, the user selects the Map Information Transmission Triggering Conditions. For example, the user can elect to have new position-related map information transmitted to the navigation device whenever the navigation device has moved a specified distance. That is, the user can elect to have new map information displayed on navigation device whenever the navigation device has moved, for example, 50 miles in any direction. Because the transmitted map information is related to the position of the navigation device, the map information automatically transmitted to the user covers the area in which the navigation device is presently located. Thus, the present embodiment provides an automatically refreshed map of the area through which the navigation device is traveling.

Figure 7A:
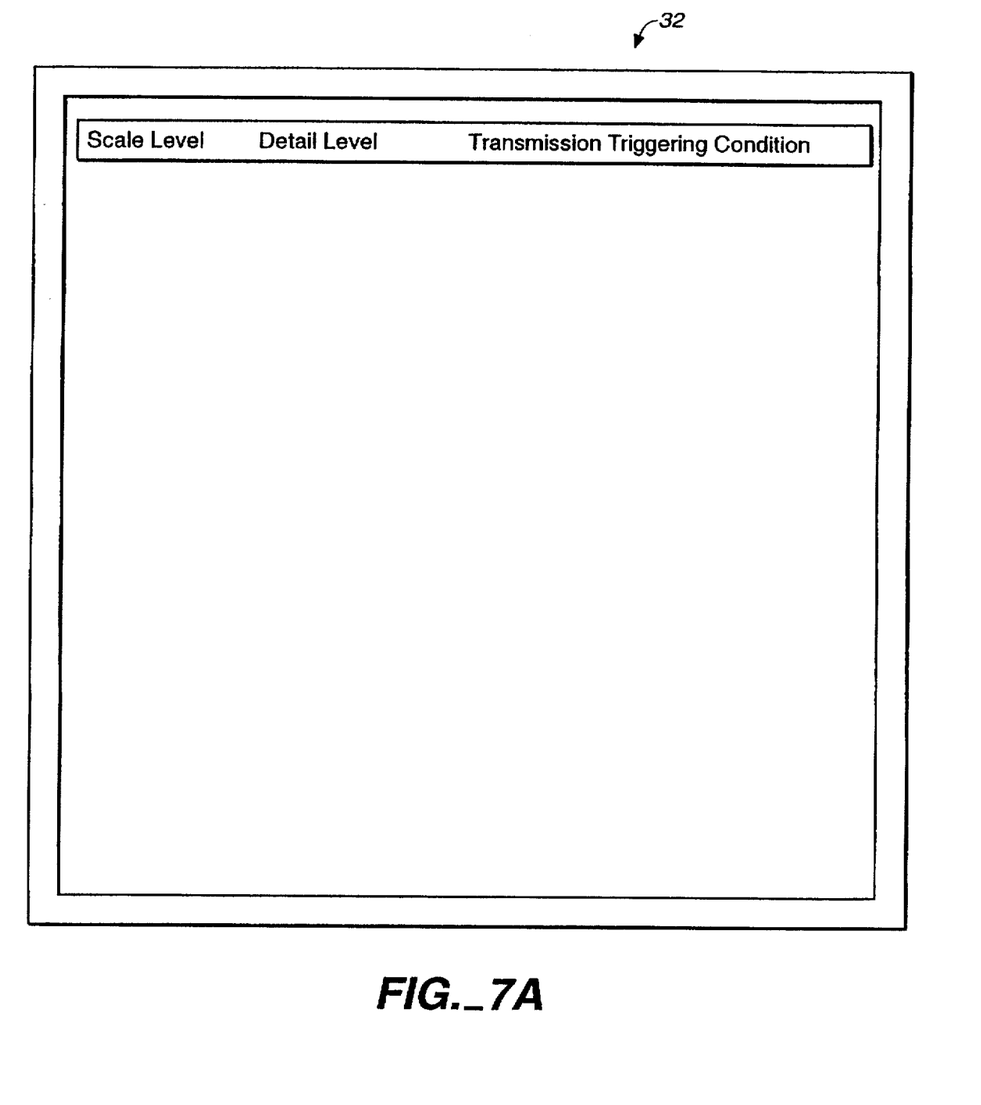
FIGS. 7A–7B are typical resolution level selection screen displays including a map transmission triggering condition selection tab in accordance with the present claimed invention.
Figure 7B:
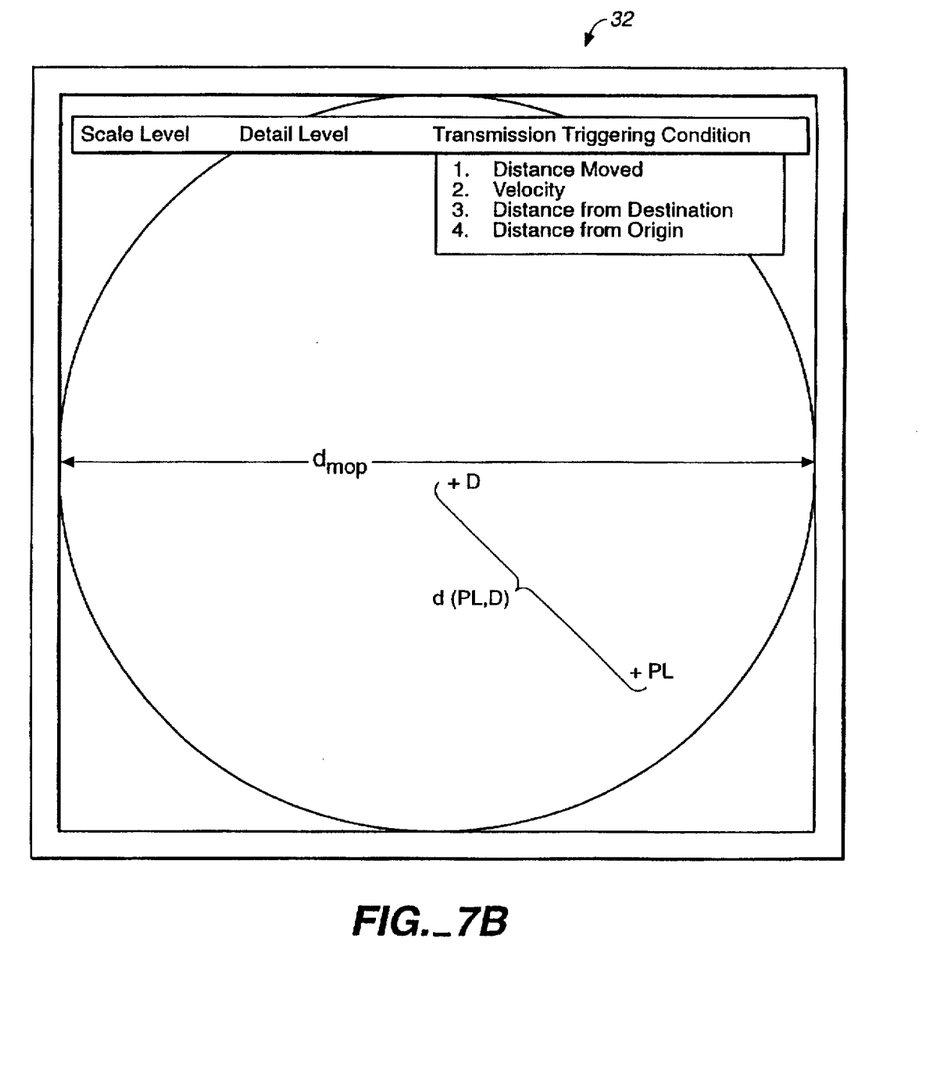

With reference next to FIGS. 7A–7B, typical screen displays are shown in accordance with the present claimed invention. As shown in FIG. 7A, the display also includes a Transmission Triggering Condition tab. With reference next to FIG. 7B, in the present embodiment, as the user pulls down on the Transmission Triggering Condition tab, numerous triggering options are presented. In the present embodiment, the user can select Distance Moved, Velocity, Distance from Destination, and Distance from Origination as map information transmission triggering conditions. Although specific transmission triggering conditions are cited above, the present invention is also well suited to the use of numerous other transmission triggering conditions.

With reference still to FIGS. 7A–7B, as the user travels along a selected route R from the initial location (I) to the destination location D, the straight-line distance or route distance d(PL,D) from the user's present location PL to the destination location D decreases approximately monotonically. If a map scale S=SO (e.g., 1 cm=0.5 miles) is adopted initially that includes the entire route R, this scale may be appropriate where the user travels on well known, heavily used roads and highways over the majority of the route. However, when the user moves closer to the destination location D, the user will often be required to use less well traveled roads, streets and paths, some of which may not appear or be representable on a map using the initial scale SO. In this instance, the scale S of the map, and possibly the level of detail as well, should be changed in one or more stages as the user approaches the destination location. For example, if the map display includes a circle of maximum diameter $d_{map}$ and if the distance between the user's present location PL and the destination location D is d(PL, D), the map scale S may be changed so that the straight-line distance on the map between the user's present location PL and the destination location D is between $d_{map}/4$ and $d_{map}/2$, if either the user's present location PL or the destination location D is positioned at the center of the map display, as illustrated in FIG. 7B. This requires a choice of scale satisfying the constraints:

$$d_{map}/4d(PL,D)) \leq S \leq d_{map}/(2d\ (PL,D)).$$

Thus, as the distance d(PL,D) decreases, the map scale S will increase. This change of map scale may be accomplished in N stages (N≧1) by choosing N spaced apart values of the distance d(PL,D) at which a new map scale is introduced. Each time the map scale is changed, the level of map detail is preferably changed to provide progressively more information on local roads, streets and paths that may be needed to reach the destination location D. Map detail level may also automatically change with distance d(PL,D).

Figure 8:
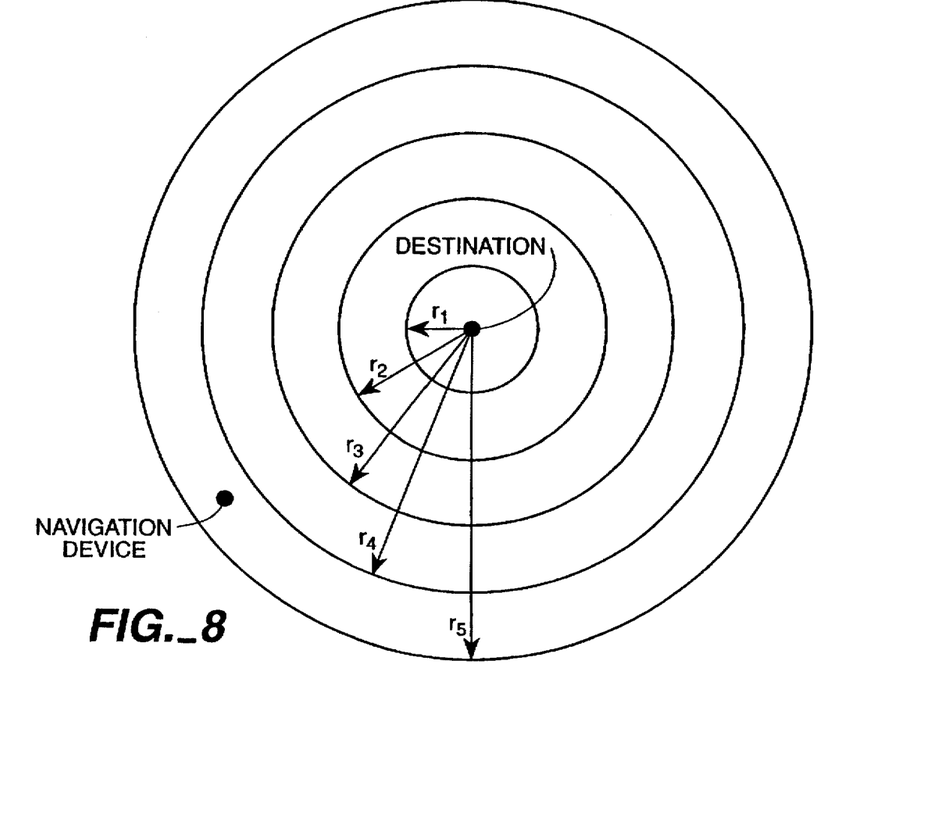
FIG. 8 is a diagram illustrating a Map Information Transmission Triggering Condition in accordance with the present claimed invention.

With reference next to FIG. 8, a diagram illustrating the "Distance from Destination" transmission triggering condition is shown. In the present embodiment, the user enters the destination address into the present navigation device using, for example, a keypad. The user then selects the interval at which new map information will be transmitted to the user. For example, the user would designate that new map information will be transmitted to the navigation device each time the navigation device has moved 10 miles closer to the destination. As shown in FIG. 8, in such an example radius $r_1$ would be 10 miles shorter than $r_2$, $r_2$ would be 10 miles shorter than $r_3$, etc. In the present invention, the position of the navigation device is determined by the position determining system and is transmitted to the base station. Thus, the present invention readily determines when the navigation device has crossed over a threshold distance and, the base station transmits new map information to the navigation device. Hence, the present embodiment provides for automatic transmission of position-related map information to a navigation device.

With reference again to FIG. 5, in the final step, step 62, the user adjusts the Zoom Level. The Zoom Level is adjusted in the same manner as described above in conjunction with the previous embodiment.

In the present embodiment, position information generated by position determining system 26 of FIG. 4 is automatically transmitted to base station 22. The present invention is well suited to automatically transmitting position information to base station 22 at any given time interval.

Thus, the present invention provides a navigation system which does not require carrying an extensive collection of CD-ROM discs within the vehicle, a system which is able to tailor the information provided to a user, and a system which is useful in conjunction with a GPS over a large area.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A navigation system for providing map information of varying resolution to a navigation device comprising:
   a base station transmitting map information of varying resolution therefrom,
   a navigation device, said navigation device further comprising;
      a receiver receiving said map information of varying resolution transmitted from said base station,
      a processor coupled to said receiver, said processor processing said map information of varying resolution received by said receiver, and
      a display visually displaying said map information of varying resolution, and
   a position determining system coupled to said navigation device, said position determining system generating position information of said navigation device, said position determining system including a transmitter transmitting said generated position information of said navigation device to said base station,
   wherein said map information of varying resolution transmitted from said base station is related to said generated position information of said navigation device transmitted to said base station from said position determining system.

2. The system of claim 1 wherein said map information of varying resolution transmitted from said base station is related to the location of said navigation device.

3. The system of claim 1 wherein said map information of varying resolution transmitted from said base station is related to the velocity of said navigation device.

4. The system of claim 1 wherein said navigation device further includes an activatable request mechanism requesting transmission of said map information of varying resolution from said base station when said activatable request mechanism is activated.

5. The system of claim 1 wherein said map information of varying resolution transmitted from said base station map information is compressed.

6. The system of claim 5 wherein said processor of said navigation device decompresses said compressed map information of varying resolution transmitted from said base station.

7. The system of claim 1 wherein said position determining system further includes:
   a radio navigation signal receiver, and
   a radio navigation signal processor having an input coupled to said radio navigation signal receiver, said radio navigation signal processor generating said position information from radio navigation signals received at said input from said radio navigation signal receiver, said radio navigation signal processor having an output coupled to said transmitter of said position determining system.

8. A method of providing map information of varying resolution to a navigation device comprising the steps of:
   generating position information of a navigation device,
   transmitting said position information of said navigation device to a base station,
   transmitting map information of varying resolution related to said position information of said navigation device from said base station to said navigation device,
   receiving said map information at said navigation device, and displaying at said navigation device said map information related to said position information of said navigation device such that a visual representation of said map information related to said position information of said navigation device is produced.

9. The method as recited in claim 8 wherein said step of transmitting position information of said navigation device to said base station further includes the step of automatically transmitting said position information to said navigation device.

10. The method as recited in claim 8 wherein said step of transmitting position information of said navigation device to said base station further includes the step of activating the transmission of said map information by activating a position information transfer mechanism.

11. The method as recited in claim 8 wherein said step of transmitting map information related to said position information of said navigation device further includes the step of automatically transmitting said map information to said navigation device.

12. The method as recited in claim 8 wherein said step of transmitting map information related to said position information of said navigation device further includes the step of activating the transmission of said map information by activating a map information request mechanism.

13. The method as recited in claim 8 wherein said step of transmitting map information related to said position information of said navigation device further includes the step of transmitting compressed map information to said navigation device.

14. The method as recited in claim 8 wherein said step of transmitting map information related to said position information of said navigation device further includes the step of transmitting map information related to the location of said navigation device.

15. The method as recited in claim 8 wherein said step of transmitting map information related to said position information of said navigation device further includes the step of transmitting map information related to the velocity of said navigation device.

16. The method as recited in claim 8 wherein said step of transmitting map information related to said position information of said navigation device further includes the step of transmitting compressed map information to said navigation device.

17. The method as recited in claim 16 wherein said step of receiving said map information related to said position information of said navigation device further includes the step of processing said compressed map information.

18. The method as recited in claim 17 wherein said step of processing said map information related to said position information of said navigation device further includes the step of decompressing said compressed map information.

19. An apparatus for providing map information of varying resolution to a navigation device comprising:
   a base station adapted to transmit map information of varying resolution therefrom,
   a navigation device communicatively coupled to said base station, said navigation device further comprising:
      a receiver adapted to receive said map information of varying resolution transmitted from said base station, and
      a display adapted to display said map information of varying resolution, and
   a position determining system coupled to said navigation device, said position determining system generating position information of said navigation device, said position determining system communicatively coupled to said base station, said position determining system adapted to transmit said position information of said navigation device to said base station, wherein said map information of varying resolution transmitted from said base station is related to said generated position information of said navigation device transmitted to said base station from said position determining system.

* * * * *